March 7, 1950 L. D. THOSTENSON 2,499,937
STEERING SHAFT BEARING STRUCTURE FOR MOTOR VEHICLES
Original Filed Sept. 9, 1946 2 Sheets-Sheet 1

INVENTOR:
LEWIS D. THOSTENSON
BY HIS ATTORNEYS
HARRIS, KIECH, FOSTER & HARRIS

March 7, 1950 L. D. THOSTENSON 2,499,937
STEERING SHAFT BEARING STRUCTURE FOR MOTOR VEHICLES
Original Filed Sept. 9, 1946 2 Sheets-Sheet 2
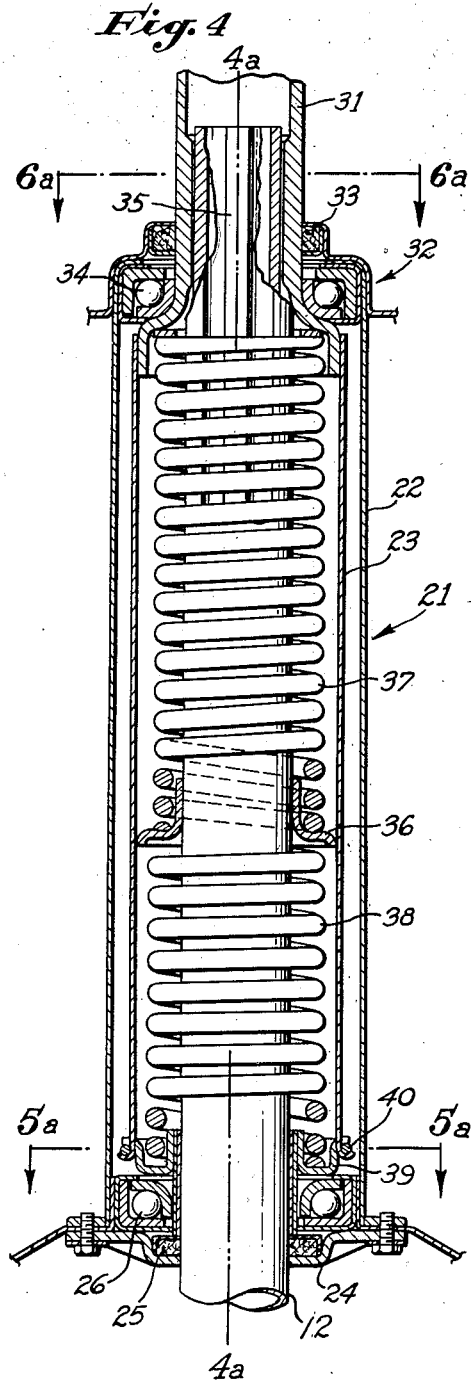
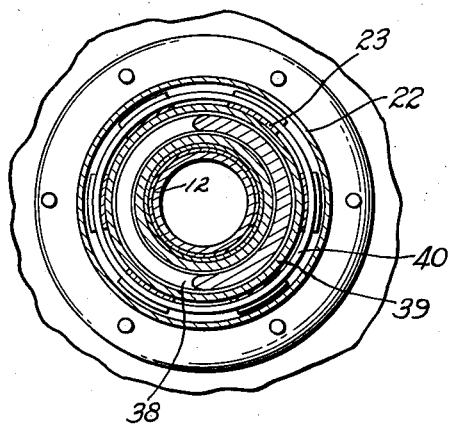
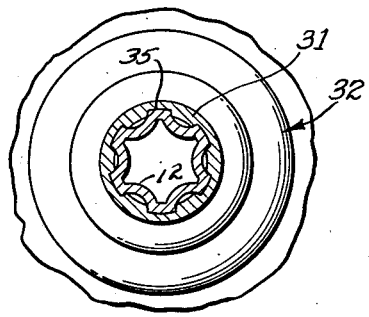
INVENTOR:
LEWIS D. THOSTENSON
BY HIS ATTORNEYS
HARRIS, KIECH, FOSTER & HARRIS Patented Mar. 7, 1950

2,499,937

UNITED STATES PATENT OFFICE 2,499,937

STEERING SHAFT BEARING STRUCTURE FOR MOTOR VEHICLES

Lewis D. Thostenson, Inglewood, Calif., assignor to Salsbury Corporation, a corporation of California Original application September 9, 1946, Serial No. 695,592. Divided and this application April 28, 1947, Serial No. 744,280

6 Claims. (Cl. 280—276)

This invention relates to motor vehicles and has a special utility when applied to a motor driven bicycle or tricycle. The present application is a division of an application for Front end of a motor vehicle, Serial No. 695,592, filed September 9, 1946, of which I am co-applicant.

The vehicle hereinafter described may be called a motor driven bicycle, since it has two wheels, the rear wheel being driven by a motor and the front wheel being turned by handle bars to steer the vehicle. The wheels are smaller, however, than those ordinarily used on bicycles and are placed farther apart so that the rider may sit on a flat seat with his legs together and his feet resting on a flat surface.

The invention has for its objective the provision of a novel form of bearing structure for the steering shaft.

The advantages obtained by the use of this novel structure will be made apparent hereinafter.

In the drawings:

Fig. 4 is a side view, partly in section, of the steering shaft bearing assembly;

Fig. 5 is a section on a plane represented by the line 5a—5a of Fig. 4; and

Fig. 6 is a section on a plane represented by the line 6a—6a of Fig. 4.

Figure 1:
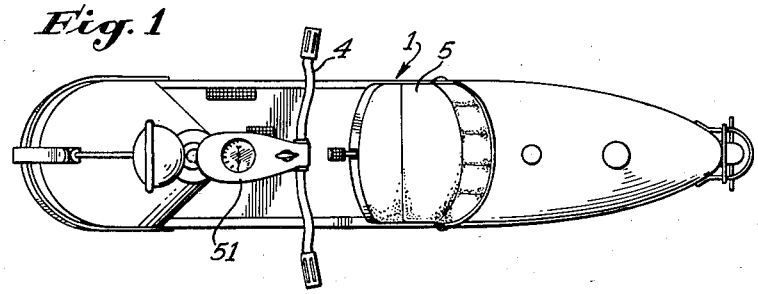
Fig. 1 is a view as seen from above the vehicle in which the invention is embodied.
Figure 2:
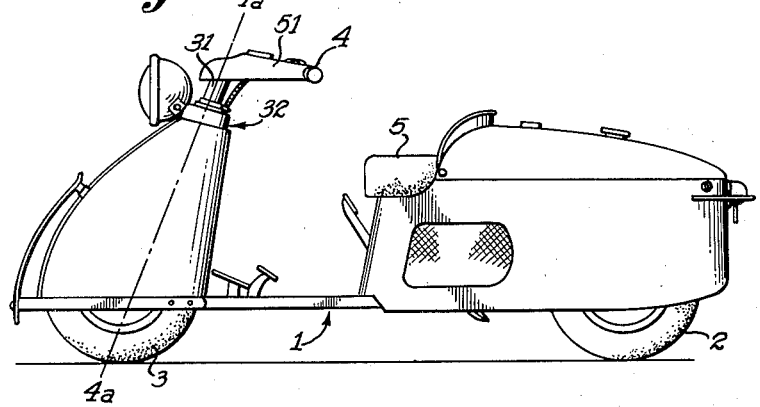
Fig. 2 is a side view of this vehicle.
Figure 3:
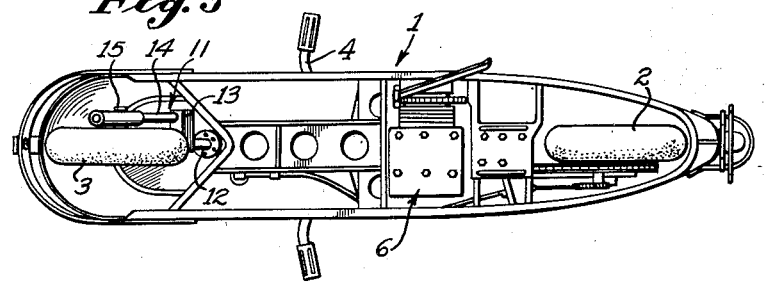
Fig. 3 is a view of this vehicle as seen from below the vehicle.

The present invention is best illustrated by disclosing its application to a motor driven bicycle, which is illustrated in the drawings, Figs. 1, 2, and 3 showing the complete vehicle. This vehicle consists of a body 1 supported on a rear wheel 2 and a front wheel 3, the vehicle being steered by handle bars 4 which turn about a steering axis indicated by the line 4a—4a in various figures. The driver sits upon a seat 5 with his feet on a flat support forming part of the body 1. The rear wheel 2 is driven by an engine 6 situated below and a little behind the seat 5. The engine is controlled by the driver by means forming no part of the invention claimed herein and is therefore not described. In the present improved motor vehicle, the front wheel 3 is rotatable on a wheel shaft or axle 15 which is carried at the lower end of a carrier 11 including a strut 14 which, in turn, is connected by an arm 13 to a steering shaft 12 (Fig. 3). The shaft 12 carries a tube 31 at its upper end and rigidly secured to the tube are the handle bars 4 for turning the shaft to steer the vehicle.

The steering shaft 12 is adapted to turn in a bearing assembly 21, details of which are shown in Figs. 4, 5 and 6. The steering shaft assembly consists of an outer cylinder shell 22, which is fixed with relation to the body of the vehicle, and an inner cylindrical shell 23, which turns with the steering shaft 12. A lower closure plate 24 fixed with relation to the outer shell 22 carries a felt washer 25 which fits closely on the shaft 12 and acts as a grease retainer. A lower ball bearing 26 acts to provide an anti-friction bearing between the shell 22 and parts fixed to the steering shaft 12 which rotate inside the shell, this bearing also acting as a thrust bearing for downward pressure along the axis 4a—4a.

The handle bar tube 31 is rigidly secured to and turns with the inner shell 23, being turned by the handle bars 4. The handle bar tube 31 projects through a top closure member 32, forming a part of the front end support for the vehicle, this closure member 32 also carrying a felt washer 33. The upper end of the outer shell 22 is rigidly fixed in the top closure member 32. An upper ball bearing 34 provides an anti-friction bearing between the stationary closure member 32 and the steering tube 31, which is turned by the handle bars 4, this bearing also transmitting any upward thrust along the axis 4a—4a to the member 32. The two bearings 26 and 34 hold the inner shell 23 against movement along the axis 4a—4a with relation to the outer shell 22. The upper end of the steering shaft 12 is splined inside the steering tube 31, as shown at 35, so that the shaft 12 can move, within limits, along the axis 4a—4a inside the tube 31. In practice, the shaft 12 may be of tubular form, but functionally it could be solid, and it is called a shaft to distinguish it from the steering tube 31. Any movement of the wheel along the axis 4a—4a is transmitted through the carrier 11 to the steering shaft 12, but is not transmitted to the tube 31, which is prevented from such movement as it is rigidly fixed to the inner shell 23, which is prevented from so moving by the ball bearings 26 and 34. Any movement of the shaft 12 along the axis 4a—4a is resisted by springs, as will now be described.

Rigidly secured to the shaft 12 is a ring 36, and an upper helical compression load-carrying spring 37 surrounds the shaft 12 above the ring 36, the upper end of the spring acting upwardly against the enlarged end of the handle bar tube 31 and the lower end acting downwardly against the shaft 12 through the ring 36. A rebound helical compression spring 38 surrounds the shaft 12 below the ring 36, the upper end of this spring acting against the ring 36 and the lower end acting against a ring 39 rigidly secured by a wire 40 to, and closing the lower end of, the inner shell 23.

The steering shaft bearing structure, shown in Figs. 4, 5, and 6, also has certain advantages. The collar 36 can assume a position anywhere within limits with relation to the axis 4a—4a, this position being determined with the vehicle at rest by the dead weight carried on the front wheel. With the vehicle in motion, the collar 36 can change its position to suit variations in the road surface and relieve shocks on the tire of the front wheel without transmitting these shocks to the handle bars 4. Since there is very little unsprung weight on the front wheel, the tire of that wheel is not subjected to undue wear.

I claim as my invention:

1. In a vehicle of the class described, a bearing structure for the steering shaft of said vehicle, comprising: an outer cylindrical shell fixed to the structure of the vehicle; an inner cylindrical shell concentric with said outer cylindrical shell about a common axis; a steering shaft concentric with said axis; a steering tube concentric with said axis; means for connecting said steering tube to an end of said inner shell so as to provide an end extension thereof, said steering shaft extending through said inner shell and projecting into said steering tube; spline means permitting said steering shaft to move along said axis, within limits, inside said tube, said spline means also preventing said shaft from rotating with relation to said tube about said axis; and spring means disposed within said inner shell and operatively engaged between said shaft and said inner shell so as to resist said movement of said shaft inside said tube.

2. In a vehicle of the class described, a bearing structure for the steering shaft of the vehicle, comprising: an outer cylindrical shell fixed to the structure of the vehicle; an inner cylindrical shell concentric with said outer cylindrical shell about a common axis; a steering shaft coaxial with said inner shell; a steering tube coaxial with said shaft and having a flared end; means for connecting said flared end of said steering tube within one end of said inner shell, said steering shaft extending through said inner shell and projecting into said steering tube; spline means permitting said steering shaft to move along said axis, within limits, inside said tube, said spline means also preventing said shaft from rotating with relation to said tube about said axis; an abutment on said shaft within said inner shell; and spring means disposed within said inner shell and engageable with said abutment to resist axial movement of said shaft in either direction.

3. In a vehicle of the class described, a bearing structure for the steering shaft of the vehicle, comprising: an outer cylindrical shell fixed to the structure of the vehicle; an inner cylindrical shell concentric with said outer cylindrical shell about a common axis; a steering shaft coaxial with said inner shell; a steering tube coaxial with said shaft and having a flared end; means for connecting said flared end of said steering tube within one end of said inner shell, said steering shaft extending through said inner shell and projecting into said steering tube; spline means permitting said steering shaft to move along said axis, within limits, inside said tube, said spline means also preventing said shaft from rotating with relation to said tube about said axis; an abutment on said shaft within said inner shell; a first spring means disposed within said inner shell and engaging against one side of said abutment and tending to move said shaft in a direction to withdraw said steering shaft from said steering tube; and a second spring means disposed within said inner shell and engaging against the other side of said abutment to counteract the force of said first spring means.

4. In a vehicle of the class described, a bearing structure for the steering shaft of the vehicle, comprising: an outer cylindrical shell fixed to the structure of the vehicle; an inner cylindrical shell concentric with said outer cylindrical shell about a common axis; a ring connected to one end of said inner shell; a steering shaft coaxial with said inner shell and extending through said ring; a steering tube coaxial with said shaft and having a flared end; means for connecting said flared end of said steering tube within the other end of said inner shell, said steering shaft extending through said inner shell and projecting into said steering tube; spline means permitting said steering shaft to move along said axis, within limits, inside said tube, said spline means also preventing said shaft from rotating with relation to said tube about said axis; an abutment on said shaft within said inner shell; a first spring means disposed within said inner shell between said flared end and said abutment and tending to move said shaft in a direction to withdraw said steering shaft from said steering tube; and a second spring means disposed within said inner shell between said ring and said abutment to counteract the force of said first spring means.

5. In a vehicle of the class described, a bearing structure for the steering shaft of the vehicle, comprising: an outer cylindrical shell fixed to the structure of the vehicle; an inner cylindrical shell concentric with said outer cylindrical shell about a common axis; a ring connected to one end of said inner shell; a steering shaft coaxial with said inner shell and extending through said ring; bearing means at one end of said outer shell for rotatably supporting one end of said shaft; a steering tube coaxial with said shaft and having a flared portion at one end; means for connecting said flared portion of said steering tube within the other end of said inner shell, said steering shaft extending through said inner shell and projecting into said steering tube; bearing means at the other end of said outer shell for rotatably supporting said one end of said steering tube; interengaging spline means on said tube and said shaft for keying said shaft and said tube for unitary rotation while permitting relative axial movement therebetween; an annular abutment secured to said shaft substantially midway between the ends of said inner shell; a first spring means disposed within said inner shell between said flared end and said abutment and tending to move said shaft in a direction to withdraw said steering shaft from said steering tube; and a second spring means disposed within said inner shell between said ring and said abutment to counteract the force of said first spring means.

6. In a vehicle of the class described, a bearing structure for the steering shaft of the vehicle, comprising: an outer cylindrical shell fixed to the structure of the vehicle; an inner cylindrical shell concentric with said outer cylindrical shell about a common axis; a ring connected to one end of said inner shell; a steering shaft coaxial with said inner shell and extending through said ring; bearing means at one end of said outer shell for rotatably supporting one end of said shaft; a steering tube coaxial with said shaft and having a flared portion at one end; means for connecting said flared portion of said steering tube within the other end of said inner shell, said steering shaft extending through said inner shell and projecting into said steering tube; bearing means at the other end of said outer shell for rotatably supporting said one end of said steering tube; interengaging spline means on said tube and said shaft for keying said shaft and said tube for unitary rotation while permitting relative axial movement therebetween; an annular abutment secured to said shaft substantially midway between the ends of said inner shell; a first spring surrounding said shaft and compressed between said flared portion of said steering sleeve and said annular abutment on said shaft and tending to move said shaft in a direction to withdraw said shaft from said tube; and a second spring surrounding said shaft and compressed between said ring and said annular abutment to counteract the force of said first spring.

LEWIS D. THOSTENSON.

REFERENCES CITED

The following references are of record in the file of this patent:

UNITED STATES PATENTS

| Number | Name | Date |
| --- | --- | --- |
| 1,188,168 | Genovese | June 20, 1916 |
| 2,032,975 | Broulhiet | Mar. 3, 1936 |
| 2,263,710 | Wallace | Nov. 25, 1941 |
| 2,357,505 | Crispell | Sept. 5, 1944 |